June 20, 1944.  F. TÖLKE  2,352,038
RESILIENT TUBULAR BODIES
Filed March 4, 1941   2 Sheets-Sheet 1
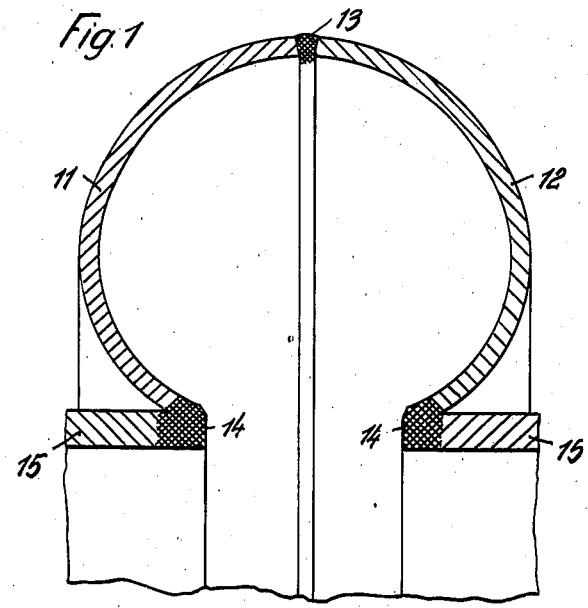
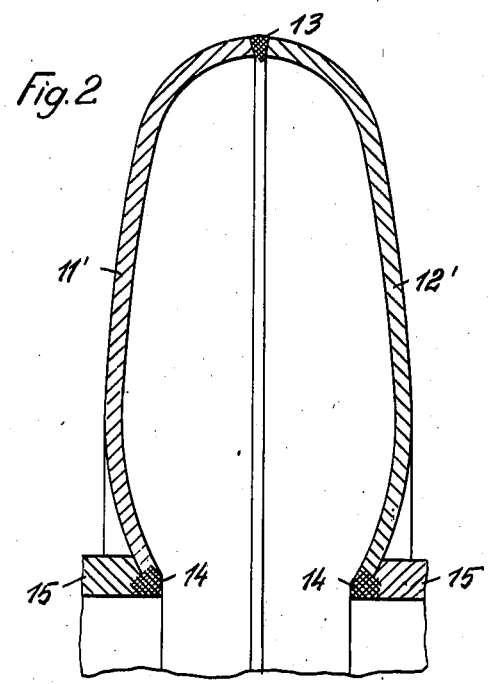
Inventor:
Friedrich Tölke,
By John B. Brady
Attorney

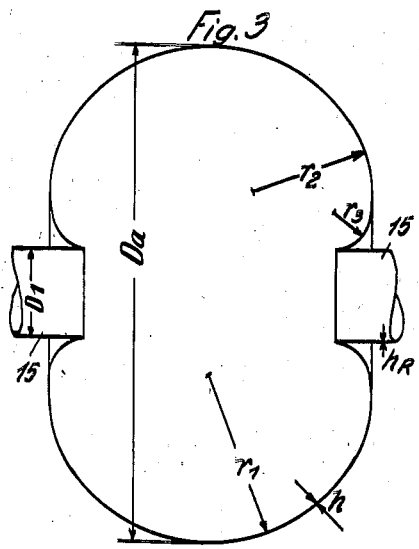
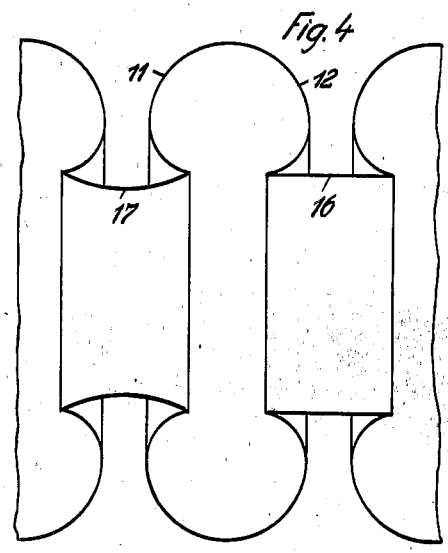
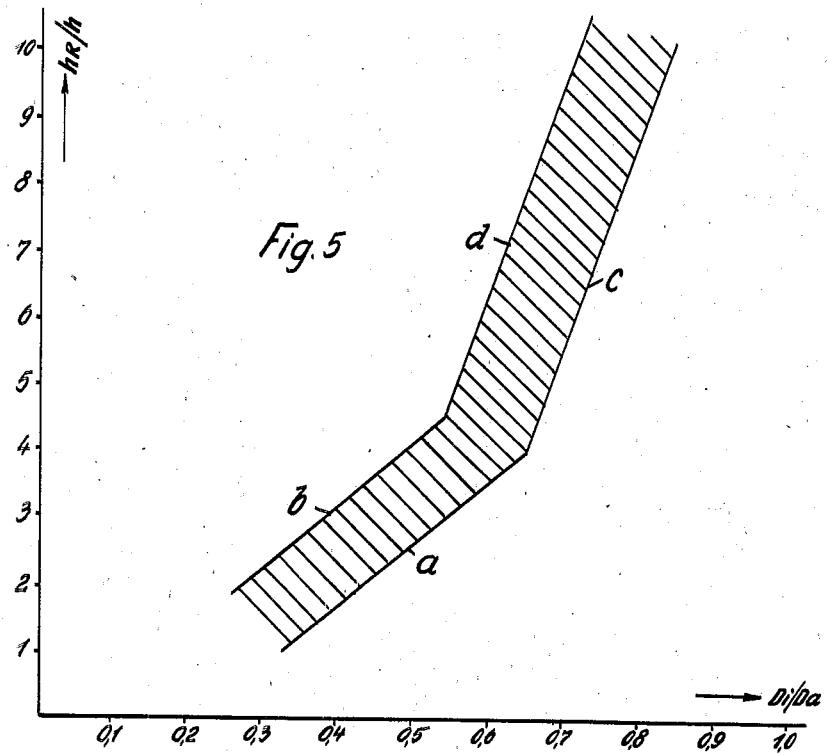

Patented June 20, 1944

2,352,038

UNITED STATES PATENT OFFICE 2,352,038

RESILIENT TUBULAR BODY

Friedrich Tölke, Berlin - Charlottenburg, Germany; vested in the Alien Property Custodian Application March 4, 1941, Serial No. 381,739
In Germany December 6, 1939

3 Claims. (Cl. 285—90)

This invention relates to resilient tubular bodies or bellows of the type used in expansion pipes, compensators, spring bodies, elastic pressure cushions, stuffing boxes for shafts, pressure regulators, pressure reducers and the like.

It is an important object of the present invention to provide annular bellows elements of a shape withstanding high pressure of the medium within the bellows, with relatively small wall thickness of the ring elements.

With this and further objects in view, as may become apparent from the within disclosures, the invention consists not only in the structures herein pointed out and illustrated by the drawings, but includes further structures coming within the scope of what hereinafter may be claimed.

The character of the invention, however, may be best understood by reference to certain of its structural forms, as illustrated by the accompanying drawings in which:

Figs. 1 and 2 are fragmentary sections of two types of bellows having the invention applied thereto.

Fig. 3 is a diagrammatic section indicating the manner in which the shape of the bellows elements may be ascertained by computation.

Fig. 4 is a diagrammatic fragmentary section indicating two possible forms of tubular connecting members between the bulbous bellows elements, and Fig. 5 is a diagram illustrating the optimum ratio of wall thickness of the pipe to thickness of the ring elements in dependence of the ratio of pipe diameter to ring diameter.

Similar characters of reference denote similar parts in the different figures.

Broadly speaking, the present invention contemplates the provision of bulbous collars for the expansion elements of the bellows which are so shaped that the strain therein owing to the interior pressure is substantially the same on all points and in any section of the collar.

Referring now to the drawings in greater detail, and first to Figs. 1 and 2, it will be noted that the resilient collar portions of the elastic tubular body consists of two shell members or annular disks 11, 12, or 11', 12', resp., which are welded together at 13, and moreover are welded to the pipe ends 15 at 14. The shell portions are so shaped that in case of inner pressure acting within the pipe the stresses set up in the shells are pure longitudinal stresses (i. e. no transverse stresses), and normally tension stresses only, while pressure stresses which might cause bending or bumps cannot occur. Thus, the duration of life of the resilient body which is greatly reduced in the known forms of resilient tubular bodies by bending and bumping phenomenons, especially at high pressure, is considerably increased.

Fundamentally, the shell portions to this end are shaped in such a manner that their interior curvature is concave throughout, without any portions having a convex inner curvature or a non-curved, straight form over a finite length. Preferably, I use a shape defined by a so-called nodoid surface (refer, e. g., Auerbach-Hort, Handbuch der Physikalischen und Technischen Mechanik, vol. VII, pp. 46–48) which depending on its use may be applied in its original shape, as shown in Fig. 1, or in a shape which is distorted by affinity or otherwise, as shown in Fig. 2. A special advantage of the nodoid surface consists in the fact that the radii of curvature of its generating or cross sectional curve are decreasing continuously from its outer part towards its inner part, i. e., as shown in Fig. 3, $r_1 > r_2 > r_3$, whereby a shell of uniform strength is produced. Where a distorted nodoid surface is used, as per Fig. 2, its generating curve may be shaped so that at least a negative or concave curvature is ensured on all points. In other words, the generating curve or cross sectional line of the shells should be curved in only one direction throughout, avoiding any points of inflection or straight portions.

In order to avoid tensions or strains due to different elongations of the tubular portions 15 and the shell portions at the welds 14, I have computed the optimum proportions of pipe thickness to shell thickness in dependence of the ratio of pipe diameter to shell diameter. The straight lines shown in Fig. 5 define the region of dependence which is formed by the four straight lines $a, b, c, d$, whose formulae are put hereunder, viz:

(a) $\quad \dfrac{h_R}{h} = 9.5\dfrac{D_i}{D_a} - 2.2$ (b) $\quad \dfrac{h_R}{h} = 9.5\dfrac{D_i}{D_a} - 0.6$ up to $\dfrac{D_i}{D_a}$ = about 0.6

(c) $\quad \dfrac{h_R}{h} = 32\dfrac{D_i}{D_a} - 17$ (d) $\quad \dfrac{h_R}{h} = 32\dfrac{D_i}{D_a} - 13$ upwards of $\dfrac{D_i}{D_a}$ = about 0.6 in which $h_R$ = wall thickness of tube
$h$ = wall thickness of shells
$D_i$ = tube diameter
$D_a$ = diameter of shells, as shown in Fig. 3.

The above mentioned definition gives a very reliable welded connection between tube 15 and shells 11, 12, or 11', 12', preventing the welds 14 (Figs. 1 and 2) from tearing. The tubular connecting member 15 between the adjacent shells may be formed in any desired manner, for example, cylindrically, as indicated at 16 in Fig. 4, or with an inward curvature, as indicated at 17 in Fig. 4.

The method and apparatus of the present invention have been described in detail with reference to specific embodiments. It is to be understood, however, that the invention is not limited by such specific reference but is broader in scope and capable of other embodiments than those specifically described and illustrated in the drawings.

I claim:

1. A resilient tubular body comprising a pair of axially spaced pipes, a larger diameter tube-like bellows element positioned between the pipes, said bellows element consisting of a pair of similar resilient ring sections, said ring sections being characterized by concavity throughout their cross sections with their marginal portions exhibiting maximum curvature, a weld disposed between and connecting the edges of the outer marginal portions of the ring sections, the marginal portions of the bellows element being positioned axially inwardly of the facing edges of the pipes, and welds formed on and connecting the edges of the pipes to the terminal edges of the marginal portions of the bellows element.

2. A resilient tubular body comprising a pair of axially spaced pipes, a larger diameter tube-like bellows element positioned between the pipes, said bellows element being characterized by concavity throughout its cross section with its marginal portions exhibiting maximum curvatures, the said marginal portions of the bellows element being positioned axially inwardly of the edges of the pipes, and welds formed on and connecting the edges of the pipes to the terminal edges of the corresponding marginal portions of the bellows element.

3. Means for connecting two axially spaced pipes comprising an annular tube-like element of substantially U-shaped cross section having at free edges engaging the ends of the pipes in butt-weld receiving relation, the portions adjacent to the free edges of said element being of substantial concave cross section and diverging outwardly from the ends of the pipes, and butt-weld means connecting the said free edges of the element to the ends of the pipes.

FRIEDRICH TÖLKE.